United States Patent [19]

Gardner

[11] Patent Number: 5,206,502
[45] Date of Patent: Apr. 27, 1993

[54] LASER RADIATION DETECTION SYSTEM
[75] Inventor: Keith L. Gardner, Ridgecrest, Calif.
[73] Assignee: The United States of America as represented by the Secretary of the Navy, Washington, D.C.
[21] Appl. No.: 735,471
[22] Filed: Oct. 21, 1976
[51] Int. Cl.[5] .............................. G01J 3/50; G01J 3/36
[52] U.S. Cl. .................................. 250/226; 356/307; 356/319; 356/331
[58] Field of Search .................... 250/226; 356/82, 88, 356/92, 307, 319, 331; 350/162 SF

[56] References Cited
U.S. PATENT DOCUMENTS

| | | | |
|---|---|---|---|
| 3,502,888 | 3/1970 | Stites | 250/226 |
| 3,701,602 | 10/1972 | Bergin et al. | 356/152 |
| 3,821,550 | 6/1974 | Priest | 250/226 |
| 3,833,299 | 9/1974 | Lang | 356/28 |
| 3,941,478 | 3/1976 | Dougherty et al. | 250/226 |
| 3,945,729 | 3/1976 | Rosen | 250/226 |
| 4,027,974 | 6/1977 | Bumgardner | 250/226 |

Primary Examiner—Stephen C. Buczinski
Attorney, Agent, or Firm—Melvin J. Sliwka; John Forrest

[57] ABSTRACT

A laser radiation detection system using a spatial/-wavelength filter to "modulate" the response of a detector as a function of wavelength, allowing discrimination of laser sources against broad spectral sources, as well as wavelength determination.

8 Claims, 2 Drawing Sheets

LASER RADIATION DETECTION SYSTEM

CROSS REFERENCE TO RELATED APPLICATIONS

The present invention relates to the same field of invention as U.S. Pat. application Ser. No. 375,243, filed 25 Jun. 1973, and U.S. patent application Ser. No. 601,237, filed 21 Jul. 1975, and a more complete understanding of the background of the invention may be had by reference thereto.

BACKGROUND OF THE INVENTION

This invention pertains to laser radiation sensor devices, and more particularly to a method and apparatus for detecting monochromatic (laser) radiation against a background of broad-band (ambient) radiation.

Advances in laser technology have produced lasers (notably dye lasers) whose radiation may be varied continuously over a broad portion of the visible and near IR spectrum. Since laser radiation is well adapted to such military applications as ranging and tracking, missile guidance, covert illumination, etc., the advent of the tuneable laser presents a problem to those who wish to detect laser radiation for threat-warning and countermeasure purposes.

To understand the requirements for a good Laser Detection System (LDS), the characteristics of the laser radiation likely to be encountered should be known. Laser radiation has the following characteristics:

1. The light has a very narrow bandwidth and is essentially monochromatic.
2. It is coherent.
3. It is usually fairly well collimated, i.e., narrow beam.
4. It may be in any state and degree of polarization, or it may be unpolarized.
5. Laser radiation used for ranging and tracking purposes will probably be pulsed. The pulses may be extremely short (on the order of nanoseconds) and the pulse repetition rate may be low (on the order of 10 pulses per second).
6. Although the laser source is likely to emit relatively high peak power, the received energy may be considerably less than from broad-band sources or ambient background.

Polarization effects of laser radiation have been used to modulate the response of a detector receiving the radiation so that the output of the detector exhibits characteristics which are a function of the wavelength of the radiation received. However, the polarization optics are expensive and limit the detector's field-of-view.

SUMMARY

The present invention facilitates discrimination of laser sources from broad spectral sources, as well as wavelength determination. A dispersive element spreads the observed beam spectrally and the light passing through the dispersive element is then passed through a spatial/wavelength filter which blocks selected narrow wavelength bands. The observed radiation is then focused onto a detector. The spatial/wavelength filter may be constructed of thin reflecting strips from which complementary radiation may be focused onto a second detector. The respective outputs of the detectors are then used in a logic system to provide the final detected output.

DESCRIPTION AND OPERATION

Figure 1:
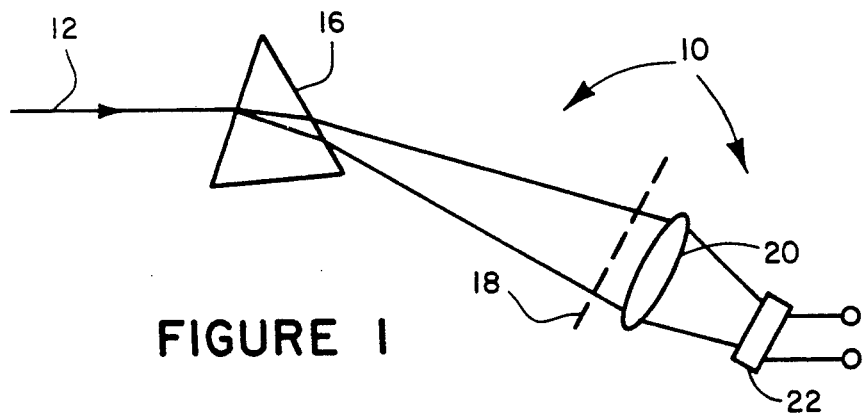
FIG. 1 is a graphic representation of a simple, single channel of a laser radiation detection system according to the present invention.

A simple, single channel of a laser radiation detection system shown in FIG. 1 is generally indicated by the numeral 10. Light indicated by the line 12 passes through a spectrally dispersive element which is here indicated as a prism 16. The dispersed radiation then falls upon a spatial/wavelength filter 18. The filter 18 blocks selected narrow wavelength bands, and the radiation which passes through the filter is focused by a lens 20 (or a mirror) onto a detector 22.

The prism 16 may be supplemented with a grating mechanism or other device which spreads the incoming beam spectrally. The spatial/wavelength filter 18 is tailored to the needs of the particular system and may be a hologram on which an interference pattern has been recorded previously.

Figure 2:
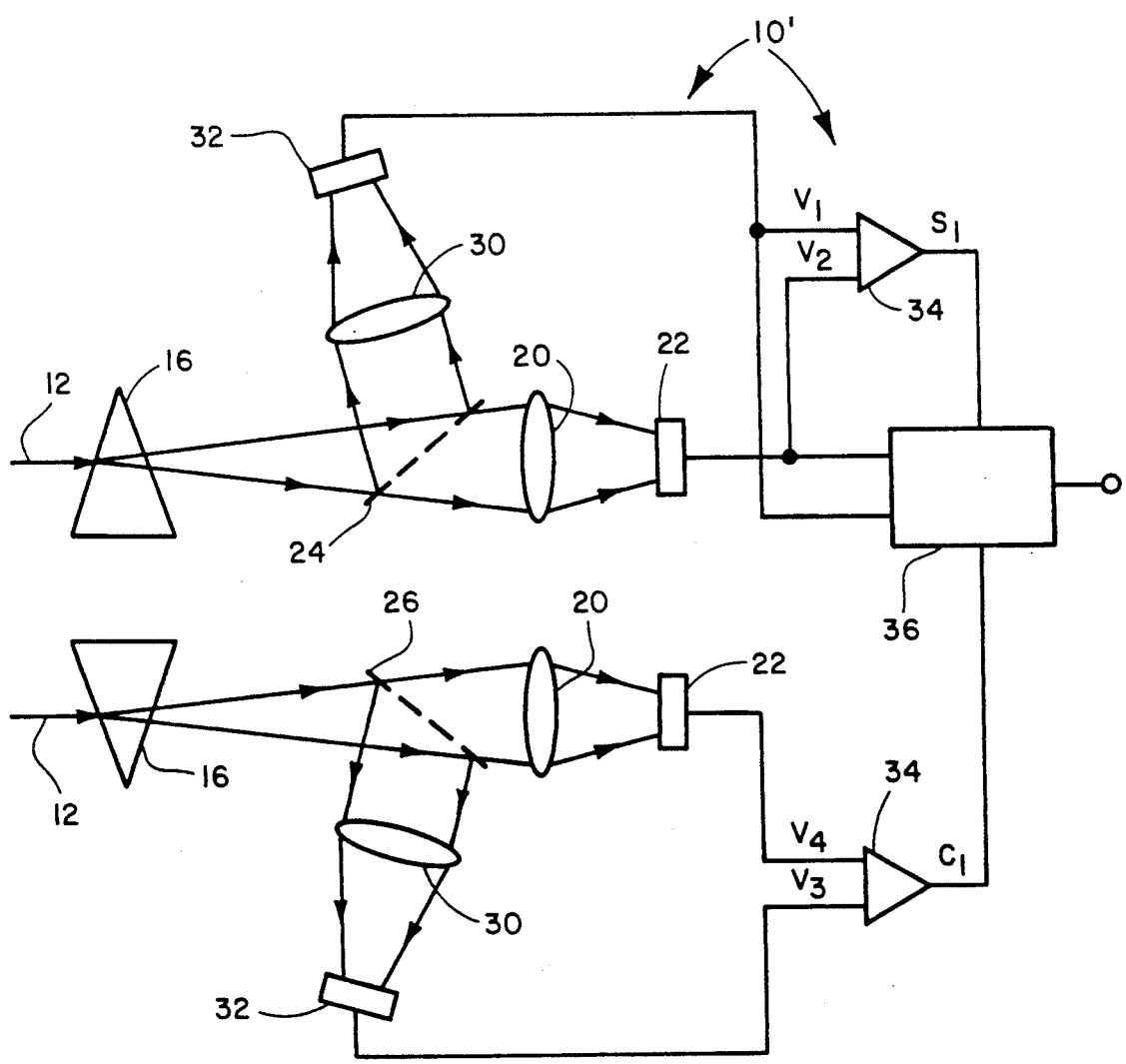
FIG. 2 is a schematic diagram of a two-channel LDS.

Referring now to FIG. 2, the filter 24 or 26, which may comprise thin reflective strips, is so constructed and arranged that a secondary or complementary beam of radiation is reflected from the filter and is focused by a second lens 30 onto a second detector 32. The output from the detectors 22, 32 then may be connected to a conventional differential amplifier 34. Outputs $S_1$ and $C_1$ from the two differential amplifiers are connected as inputs to a computer 36. Computer 36 also receives inputs corresponding to $V_1$ and $V_2$ which are used to provide a normalization factor. To achieve the capability of detecting lasers on the basis of wavelength bandwidth, a two-channel, 4 detector system as shown is required to provide uniform spectral coverage.

Figure 3A:
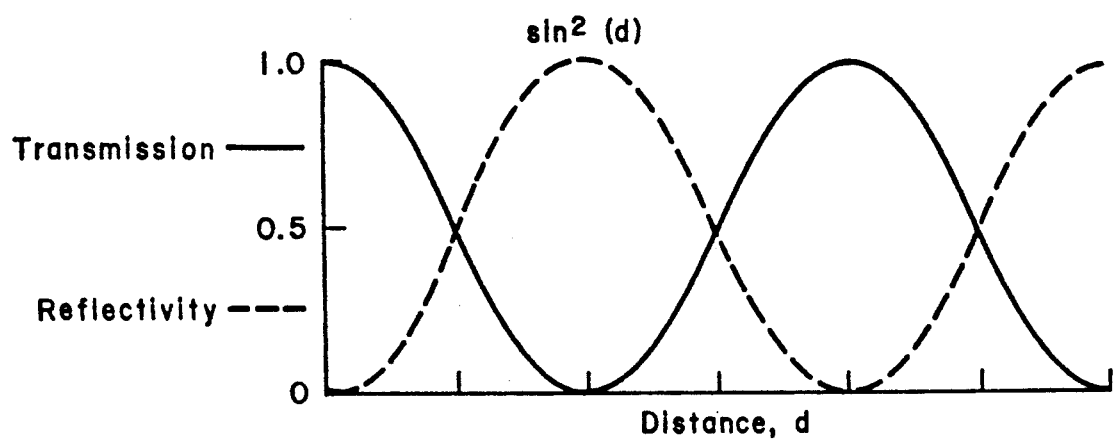
FIG. 3a and FIG. 3b are graphs showing the transmissivity/reflectivity of the spatial/wavelength filters of the two-channel LDS.
Figure 3B:
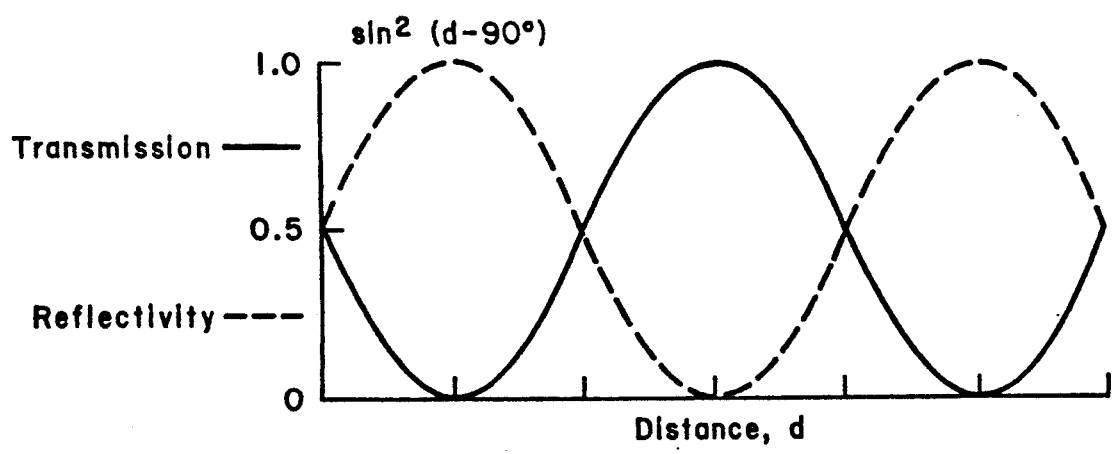

The transmissivity/reflectivity curves for filters 24 and 26 could be as shown in FIGS. 3a and 3b, respectively, where d is the distance across the face of the filters. Against a background of white noise a monochromatic source, such as a laser, will produce an output which is greater for one photodetector than for the other for a particular channel. The second channel provides a means for eliminating the ambiguity of a single channel where the incoming monochromatic source has a wavelength equivalent to a value of d where transmissivity equals reflectivity which results in equal outputs for the two photodetectors. The coherence, $\gamma$, is proportional to $\lambda^2/\Delta\lambda$ which is proportional to $(C_1^2+S_1^2)^{\frac{1}{2}}/(V_1+V_2)$ where $C_1$ is the output from one channel, $S_1$ is the output from the second channel, and $V_1, V_2$ are the outputs from the photodetectors of one of the two channels.

To determine the wavelength, a second two-channel system is added with outputs $C_2$ and $S_2$. These outputs are then processed with $C_1$ and $S_1$ to obtain an output which is approximately proportional to $K/\tan^{-1}[(C_1S_2-C_2S_1)/(C_1S_2+S_1S_2)]$ where K is a constant.

Thus, the present invention detects the presence of monochromatic (laser) radiation from a broad band (ambient) background, which is limited only by the bandwith of the photodetectors. Also, since it is a "staring" (i.e. non-scanning) system, pulsed radiation is also detected. Finally, this system is simpler and, therefore, less expensive than prior polarization techniques.

What is claimed is:

1. A laser radiation detection system for detecting monochromatic radiation with respect to a white noise background comprising:

a least one channel including:

dispersing means for spectrally receiving and dispersing incoming light incident thereon;

the output beam from said dispersing means defining an optical path;

filtering means positioned in said optical path adjacent the output of said dispersing means for spatially filtering the output of said dispersing means;

said filter operating to produce optical outputs consisting of reflected radiation and transmitted radiation when radiation impinges thereon;

the transmissivity and reflectivity of said filter means varying across the face of said filter means with respect to d where d is the distance across the face of said filter;

detector means in the path of said reflected and transmitted radiation;

each said detector means outputting signals therefrom; and differencing means operatively receiving the outputs of each said detector means and providing an output indicative of reception of monochromatic radiation in the system.

2. A system as set forth in claim 1 wherein said filter means comprises a spatial/wavelength filter.

3. A system as set forth in claim 1 wherein; said detector means comprises photodetector means.

4. A system as set forth in claim 1 wherein said filter means comprises a hologram recording of an interference pattern.

5. A system as set forth in claim 1 wherein said filter means comprises a plurality of thin reflecting strips.

6. A system as set forth in claim 1 wherein said dispersing means comprises a prism.

7. A system as set forth in claim 1 wherein said system comprises two channels each of which includes differencing means.

8. A system as set forth in claim 1 and further including:

processing means for processing the output of each said differencing means to determine the presence of monochromatic radiation.

* * * * *